(12) United States Patent
Akkarakaran et al.

(10) Patent No.: US 12,015,995 B2
(45) Date of Patent: Jun. 18, 2024

(54) QUASI CO-LOCATION SOURCE SELECTION AND INDICATION ON SIDELINK

(71) Applicant: QUALCOMM Incorporated, San Diego, CA (US)

(72) Inventors: Sony Akkarakaran, Poway, CA (US); Tao Luo, San Diego, CA (US); Ling Ding, Chester, NJ (US); Junyi Li, Franklin Park, NJ (US); Jung Ho Ryu, Fort Lee, NJ (US); Jelena Damnjanovic, Del Mar, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/137,083

(22) Filed: Dec. 29, 2020

(65) Prior Publication Data

US 2021/0204252 A1 Jul. 1, 2021

Related U.S. Application Data

(60) Provisional application No. 62/955,587, filed on Dec. 31, 2019.

(51) Int. Cl.
*H04W 72/02* (2009.01)
*H04W 56/00* (2009.01)
(Continued)

(52) U.S. Cl.
CPC ......... *H04W 72/02* (2013.01); *H04W 56/001* (2013.01); *H04W 72/046* (2013.01); *H04W 72/51* (2023.01); *H04W 72/542* (2023.01)

(58) Field of Classification Search
None
See application file for complete search history.

(56) References Cited

U.S. PATENT DOCUMENTS

| 2011/0275382 A1* | 11/2011 | Hakola | H04W 24/10 455/452.2 |
| 2014/0328329 A1* | 11/2014 | Novlan | H04W 72/23 370/336 |

(Continued)

FOREIGN PATENT DOCUMENTS

WO 2019059739 A1 3/2019

OTHER PUBLICATIONS

Ericsson: "On the Definition of Spatial QCL", 3GPP TSG-RAN WG1 #88bis, 3GPP Draft; R1-1705913, 3rd Generation Partnership Project (3GPP), Mobile Competence Centre ; 650, Route Des Lucioles; F-06921 Sophia-Antipolis Cedex; France vol. RAN WG1, No. Spokane, WA, USA; Apr. 3, 2017-Apr. 7, 2017, Apr. 2, 2017 (Apr. 2, 2017), pp. 1-4, XP051244024, Retrieved from the Internet: URL: http://www.3gpp.org/ftp/Meetings_3GPP_SYNC/RAN1/Docs/ [retrieved on Apr. 2, 2017], Section 2.4.

(Continued)

*Primary Examiner* — Alpus Hsu
*Assistant Examiner* — Camquyen Thai
(74) *Attorney, Agent, or Firm* — Patterson & Sheridan LLP

(57) ABSTRACT

Certain aspects of the present disclosure provide techniques for selecting and indicating a quasi colocation (QCL) source signal for sidelink (SL) communications. For example, a scheduling node may select from multiple candidates a signal for a first user equipment (UE) to use as a spatial QCL source for a receive (RX) or transmit (TX) beam to use for (Continued)

communicating with a second UE on a SL interface. The scheduling node may then signal the first UE an indication of the selection of the signal.

30 Claims, 14 Drawing Sheets

(51) Int. Cl.
*H04W 72/044* (2023.01)
*H04W 72/51* (2023.01)
*H04W 72/542* (2023.01)

(56) References Cited

U.S. PATENT DOCUMENTS

| | | | |
|---|---|---|---|
| 2016/0029331 A1* | 1/2016 | Seo | H04L 5/0048 370/350 |
| 2016/0241420 A1* | 8/2016 | Sorrentino | H04W 56/0015 |
| 2018/0054797 A1* | 2/2018 | Islam | H04L 5/0035 |
| 2018/0234807 A1* | 8/2018 | Park | H04W 72/30 |
| 2018/0331860 A1* | 11/2018 | Bergman | H04B 7/0617 |
| 2018/0376438 A1 | 12/2018 | Islam et al. | |
| 2018/0376471 A1* | 12/2018 | Chae | H04L 5/0044 |
| 2019/0116467 A1* | 4/2019 | Belleschi | H04W 76/27 |
| 2019/0173613 A1* | 6/2019 | Sorrentino | H04L 1/0038 |
| 2019/0199406 A1* | 6/2019 | Wang | H04B 7/0617 |
| 2019/0373592 A1* | 12/2019 | Ji | H04W 72/046 |
| 2020/0053702 A1* | 2/2020 | Cheng | H04W 72/23 |
| 2020/0304253 A1 | 9/2020 | Choi et al. | |
| 2020/0304256 A1* | 9/2020 | Park | H04L 25/03 |
| 2021/0021536 A1* | 1/2021 | Ganesan | H04L 45/20 |
| 2021/0176735 A1* | 6/2021 | Deng | H04W 72/543 |
| 2021/0314974 A1* | 10/2021 | Miao | H04W 24/10 |
| 2022/0095304 A1* | 3/2022 | Muruganathan | H04W 72/0453 |

OTHER PUBLICATIONS

Huawei, et al., "BeamForming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. , Jan. 20, 2019 (Jan. 20, 2019), XP051593708, 5 pages, Retrieved from the Internet: URL: http://www.3gpp.org/ftp/Meetings%5F3GPP%5FSYNC/RAN1/Docs/R1%2D1900862%2Ezip [retrieved on Jan. 20, 2019], Section 2.3, The whole document.
International Search Report and Written Opinion—PCT/US2020/067441—ISA/EPO—dated Apr. 7, 2021.

* cited by examiner

```
TCI-State ::=    SEQUENCE {
  tci - StateId      TCI - StatedID,
  qcl - Type1        QCL - Info,
  qcl - Type2        QCL - Info             Optional, - -
  Need R
  nrofPTRS - Ports   ENUMERATED {n1, n2}
  OPTIONAL, - - Need R
  ...
}

QCL - Info ::=   SEQUENCE {
  cell               ServCellIndex          Optional, - -
  Need R
  bwp - Id           BWP - Id               Optional, - -
  Cond CSI - RS - Indicated
  referenceSignal    CHOICE {
    csi - rs           NZP - CSI - RS - ResourceId,
    ssb                SSB - Index,
    csi - RS - for - tracking
                       NZP - CSI - RS - ResourceSetId
  },
  qcl - Type         ENUMERATED {typeA, typeB, typeC, typeD},
```

FIG. 7

| Beam Indication | Option1: Trained Directly | Option2: 'vice-verca', i.e., using the beam for the other direction, assuming UL/DL beam correspondence |
|---|---|---|
| For DL Rx | Trained via DL SSB/CSI-RS | Set to the UL Tx beam (trained via SRS) But not available from R15/16 spec |
| For UL Tx | Trained via UL SRS | Set to the DL Rx beam (trained via SSB/CSI-RS) |
| For UL Rx | Trained via UL SRS | Set to be the DL Tx beam (trained via SSB/CSI-RS) |
| For DL Tx | Trained via DL SSB/CSI-RS | Set to be the UL Rx beam (trained via SRS) But not available from R15/16 spec |

RECEIVE SIGNALING FROM A SCHEDULING NODE INDICATING A SELECTION, FROM MULTIPLE CANDIDATES BASED ON ONE OR MORE CRITERIA, OF A SIGNAL FOR THE FIRST UE TO USE AS A SPATIAL QUASI CO-LOCATION (QCL) SOURCE FOR A RECEIVE OR TRANSMIT BEAM TO USE FOR COMMUNICATING WITH A SECOND UE ON A SIDELINK INTERFACE

1104

COMMUNICATE WITH THE SECOND UE ON THE SIDELINK INTERFACE WITH A RECEIVE OR TRANSMIT BEAM DETERMINED BASED ON THE INDICATED SELECTION

FIG. 11

QUASI CO-LOCATION SOURCE SELECTION AND INDICATION ON SIDELINK

CROSS-REFERENCE TO RELATED APPLICATION

This application claims benefit of and priority to U.S. Provisional Patent Application No. 62/955,587, filed Dec. 31, 2019, which is hereby incorporated by reference in its entirety.

FIELD OF THE DISCLOSURE

Aspects of the present disclosure relate to wireless communication systems, and more particularly, to techniques for selecting and indicating a quasi colocation (QCL) source signal for sidelink (SL) communications.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink (DL) channels (e.g., for transmissions from a BS or DU to a UE) and uplink (UL) channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a scheduling node. The method generally includes selecting, from multiple candidates based on one or more criteria, a signal for a first user equipment (UE) to use as a spatial quasi co-location (QCL) source for a receive (RX) or transmit (TX) beam to use for communicating with a second UE on a sidelink (SL) interface and signaling the first UE an indication of the selection.

Certain aspects provide a method for wireless communication by a first UE. The method generally includes receiving signaling from a scheduling node indicating a selection, from multiple candidates based on one or more criteria, of a signal for the first UE to use as a spatial QCL source for a RX or TX beam to use for communicating with a second UE on a SL interface and communicating with the second UE on the SL interface with a RX or TX beam determined based on the indicated selection.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information, in accordance with certain aspects of the present disclosure.

FIG. 9 illustrates an overview of beam indications for a cellular interface, in accordance with certain aspects of the present disclosure.

FIG. 11 is a flow diagram illustrating example operations that may be performed by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
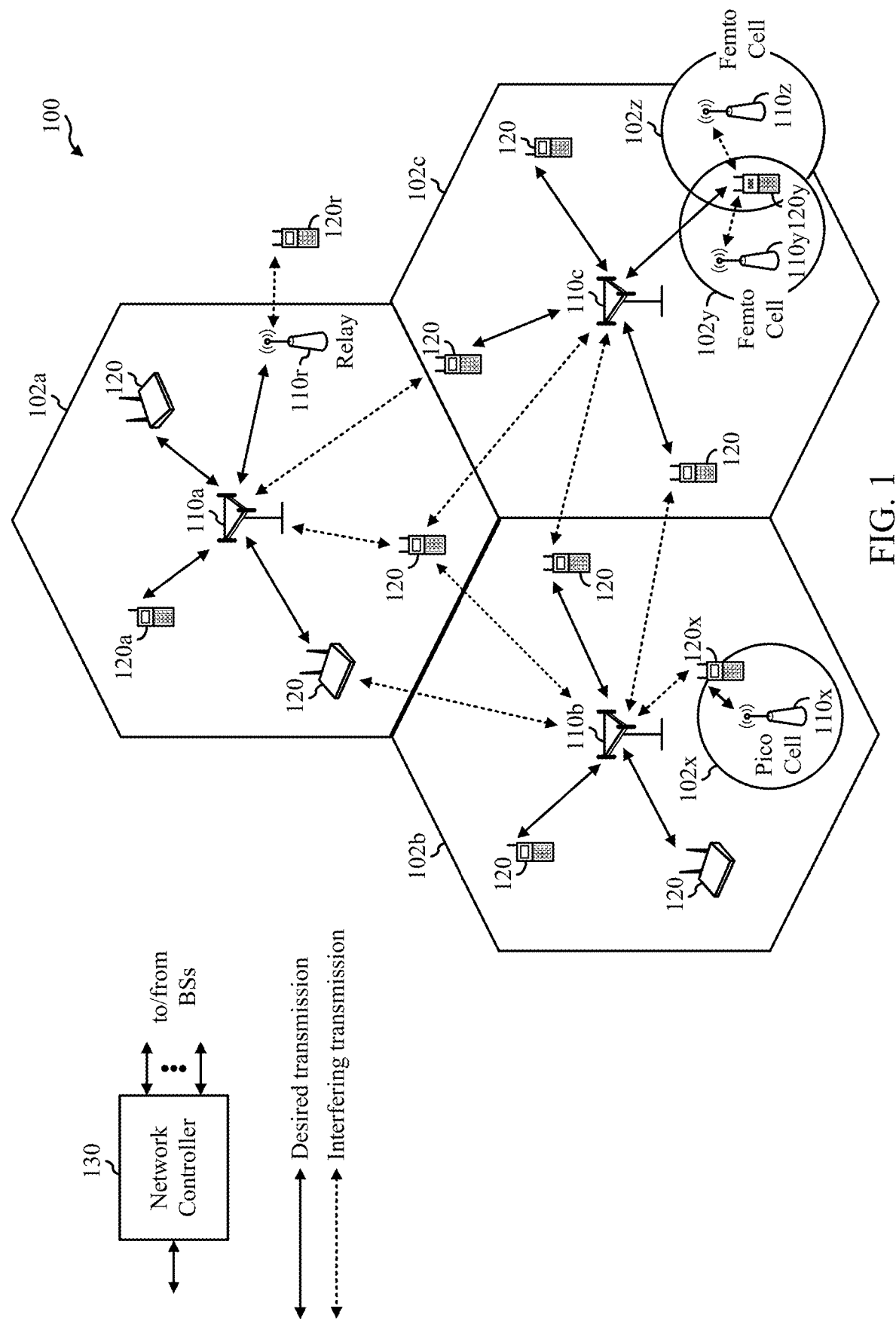
FIG. 1 is a block diagram conceptually illustrating an example telecommunications system, in accordance with certain aspects of the present disclosure.

Aspects of the present disclosure relate to wireless communications, and more particularly, to techniques for selecting and indicating a quasi co-location (QCL) source signal for sidelink (SL) communications. The QCL source signal indication may allow a user equipment (UE) to determine a receive (RX) or transmit (TX) beam to use to receive or transmit on a SL interface. The techniques may be applied for a new radio (NR) access technology or a $5^{th}$ generation (5G) technology.

The following description provides examples of QCL source signal selection and indication for SL communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G technology forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, user equipments (UEs) 120 and/or base stations (BS) 110 of FIG. 1 may be configured to perform operations described below with reference to FIGS. 10 and/or 11 to select and indicate a quasi co-location (QCL) source for sidelink (SL) communications.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on a downlink (DL) and single-carrier frequency division multiplexing (SC-FDM) on an uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
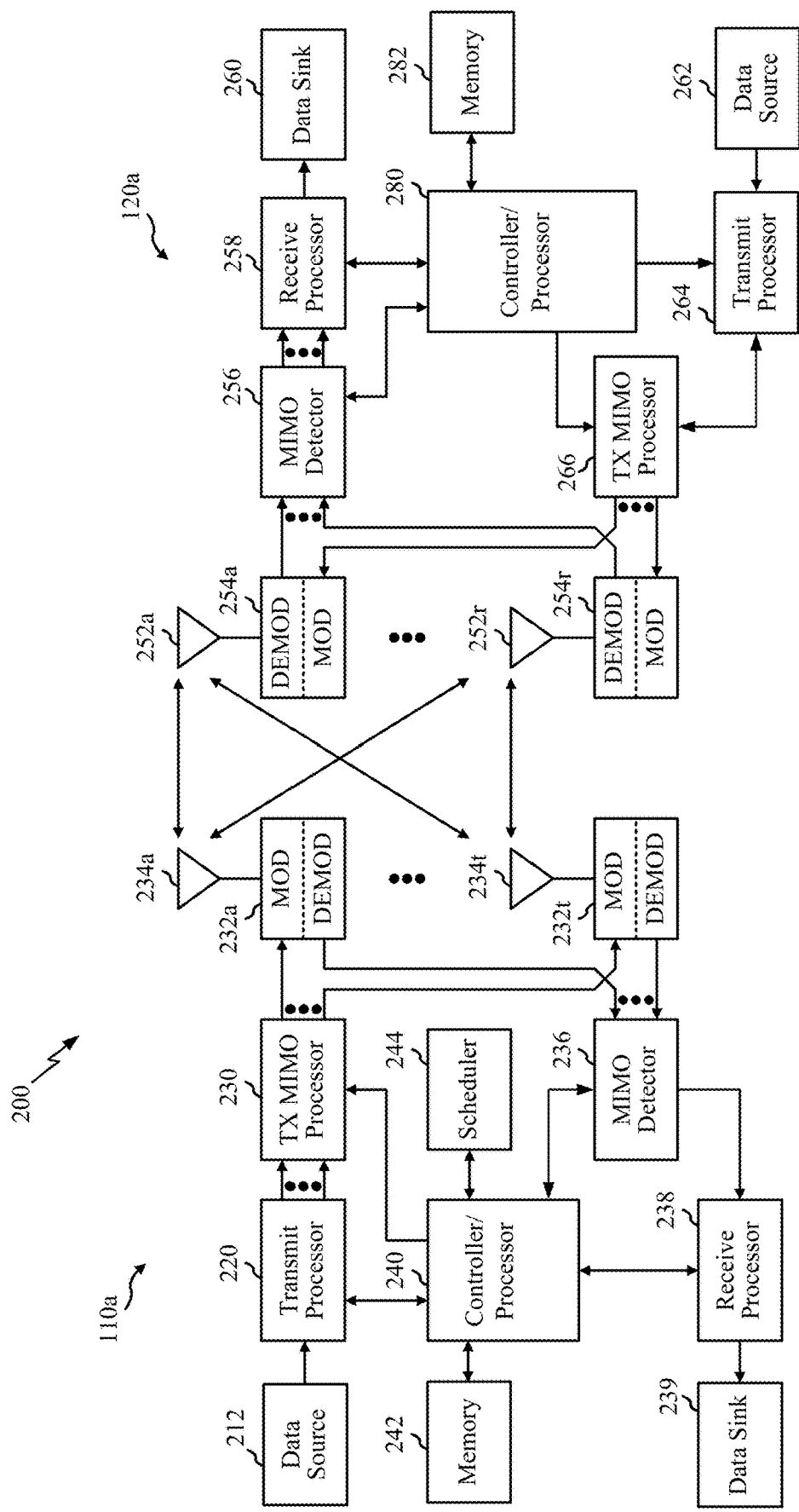
FIG. 2 is a block diagram conceptually illustrating a design of an example base station (B S) and user equipment (UE), in accordance with certain aspects of the present disclosure.

FIG. 2 illustrates example components of a BS 110a and a UE 120a (e.g., in the wireless communication network 100 of FIG. 1).

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit multiple-input multiple-output (MIMO) processor 230 may perform spatial processing (for example, precoding) on the data symbols, the control symbols, or the reference symbols, if applicable, and may provide output symbol streams to the modulators (MODs) in transceivers 232a-232t. Each MOD in transceivers 232 may process a respective output symbol stream (for example, for OFDM, etc.) to obtain an output sample stream. Each MOD in transceivers 232 may further process (for example, convert to analog, amplify, filter, and upconvert) the output sample stream to obtain a DL signal. The DL signals from MODs in transceivers 232a-232t may be transmitted via antennas 234a-234t, respectively.

At the UE 120, antennas 252a-252r may receive the DL signals from the BS 110 and may provide received signals to the demodulators (DEMODs) in transceivers 254a-254r, respectively. Each DEMOD in the transceiver 254 may condition (for example, filter, amplify, downconvert, and digitize) a respective received signal to obtain input samples. Each DEMOD in the transceiver may further process the input samples (for example, for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the UL, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a transmit MIMO processor 266 if applicable, further processed by the DEMODS in transceivers 254a-254r (for example, for SC-FDM, etc.), and transmitted to the BS 110. At the BS 110, the UL signals from the UE 120 may be received by the antennas 234, processed by the MOD in transceivers 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs for data transmission on a DL or an UL.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein. For example, as shown in FIG. 2, the controller/processor 240 of the BS 110a may be configured to perform the operations illustrated in FIG. 10, as well as other operations disclosed herein. As shown in FIG. 2, the controller/processor 280 of the UE 120a may be configured to perform the operations illustrated in FIGS. 10 and 11, as well as other operations disclosed herein, in accordance with aspects of the present disclosure. Although shown at the controller/processor, other components of the UE 120a and the BS 110a may be used performing the operations described herein.

Figure 3:
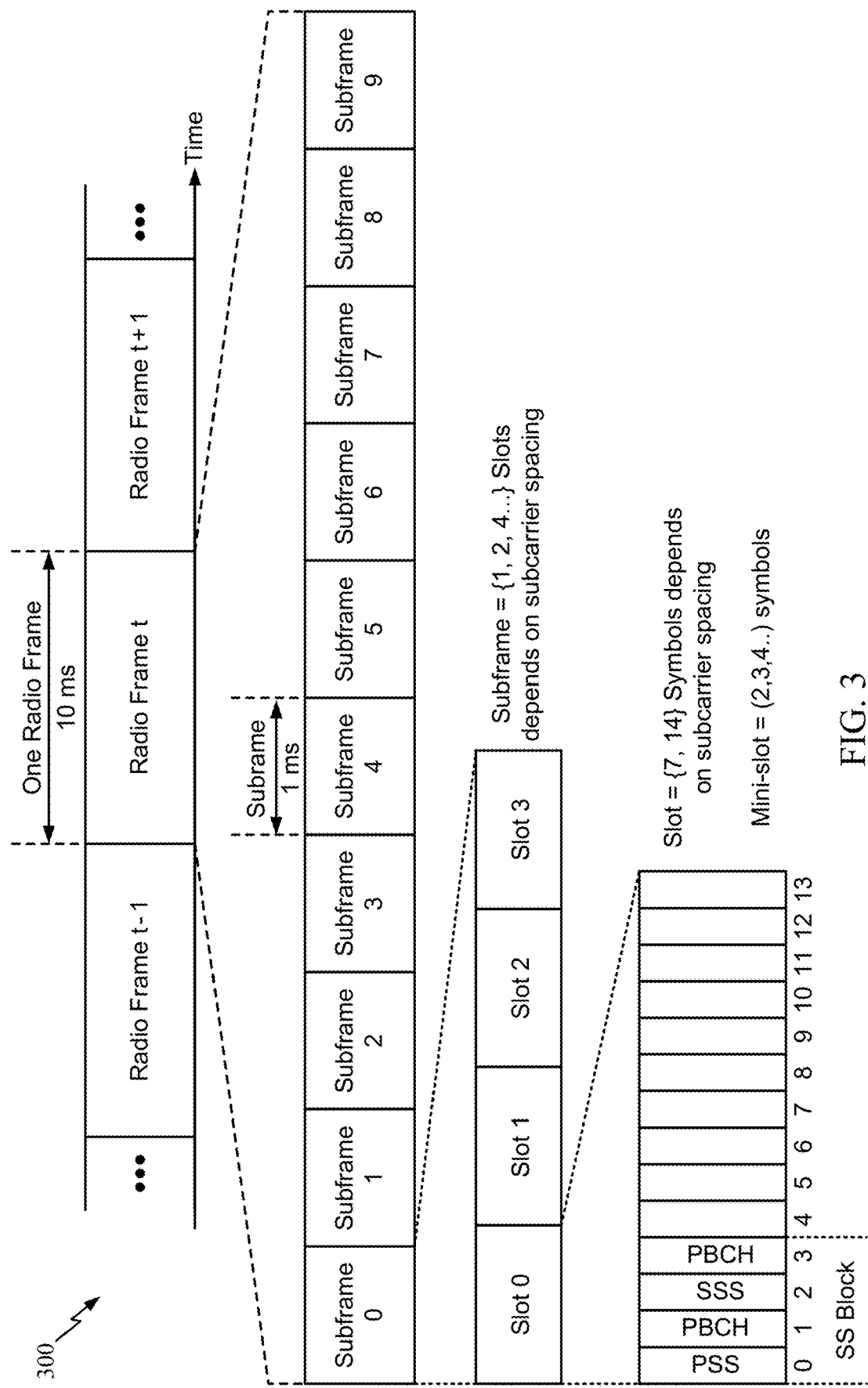
FIG. 3 illustrates an example of a frame format for a telecommunication system, in accordance with certain aspects of the present disclosure

FIG. 3 is a diagram showing an example of a frame format 300 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Beam Management Procedures

In 5$^{th}$ generation (5G) new radio (NR), various beam forming and management procedures may be used for determining and maintaining of beam pair links (BPLs).

Figure 4:
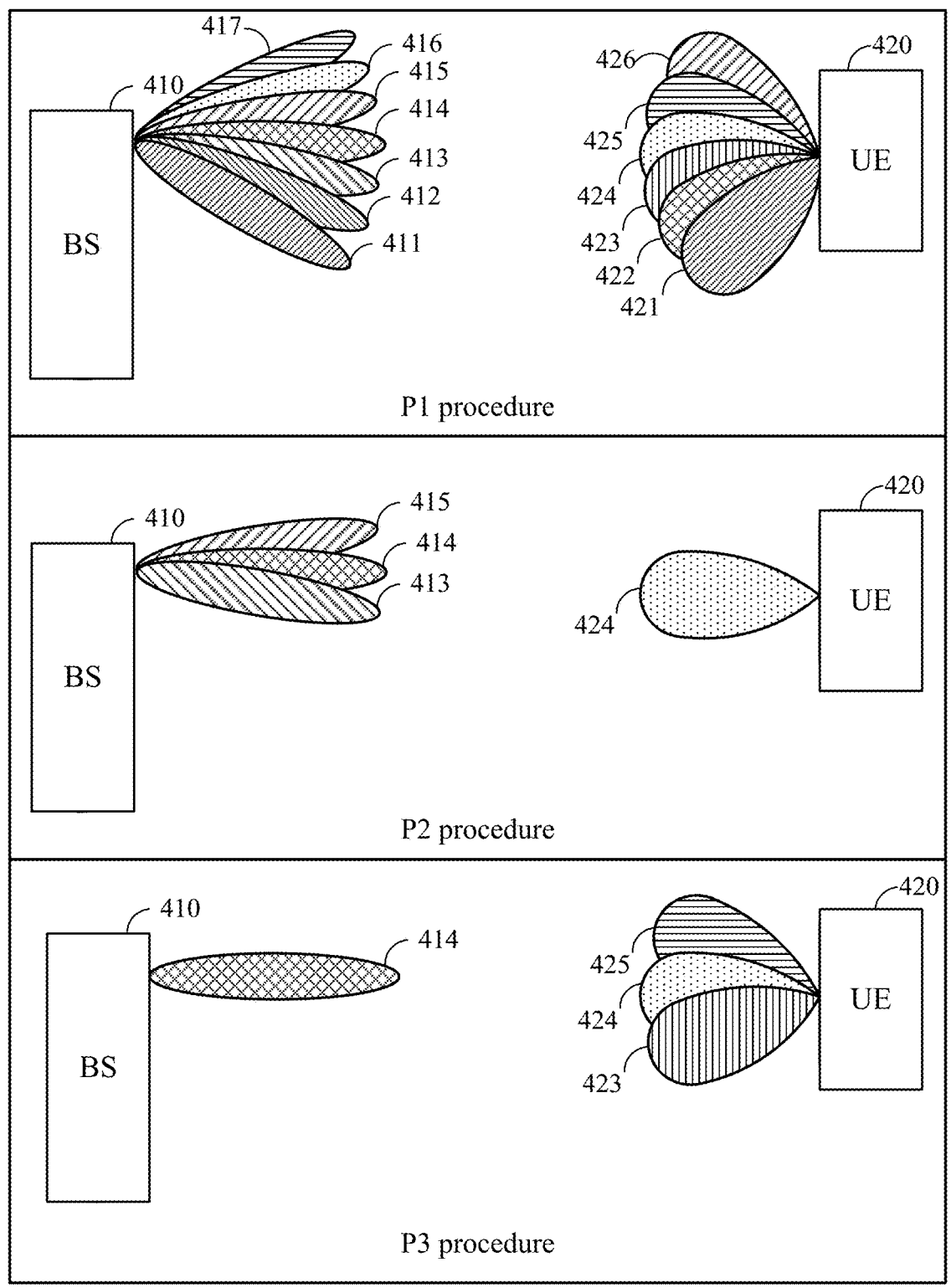
FIG. 4 illustrates example beam management procedures, in accordance with certain aspects of the present disclosure.

For example, FIG. 4 illustrates an example procedure, referred to as P1 procedure. A base station (BS) 410 (e.g., such as the BS 110a) may send a measurement request to a user equipment (UE) 420 (e.g., such as the UE 120a) and may subsequently transmit one or more signals (sometimes referred to as the "P1-signal") to the UE 420 for measurement. In the P1 procedure, the BS 410 transmits the signal with beam forming in a different spatial direction (corresponding to a transmit beam (TX beam) 411, 412, ..., 417) in each symbol, such that several (e.g., most or all) relevant spatial locations of the cell of the BS 410 are reached. In this manner, the BS 410 transmits the signal using different TX beams over time in different directions. In some examples, a synchronization signal block (SSB) is used as the P1-signal. In some examples, channel state information reference signal (CSI-RS), demodulation reference signal (DMRS), or another downlink (DL) signal can be used as the P1-signal.

In the P1 procedure, to successfully receive at least a symbol of the P1-signal, the UE 420 finds (e.g., determines/selects) an appropriate receive beam (RX beam) (421, 422, ..., 426). Signals (e.g., SSBs) from multiple BSs can be measured simultaneously for a given signal index (e.g., SSB index) corresponding to a given time period. The UE 420 can apply a different RX beam during each occurrence (e.g., each symbol) of the P1-signal. Once the UE 420 succeeds in receiving a symbol of the P1-signal, the UE 420 and BS 410 have discovered a BPL (i.e., the UE RX beam used to receive the P1-signal in the symbol and the BS TX beam used to transmit the P1-signal in the symbol). In some cases, the UE 420 does not search all of its possible UE RX beams until it finds best UE RX beam, since this causes additional delay. Instead, the UE 420 may select a RX beam once the RX beam is "good enough", for example, having a quality (e.g., signal to noise ratio (SNR) or signal to interference and noise ratio (SINR)) that satisfies a threshold (e.g., predefined threshold). The UE 420 may not know which beam the BS 410 used to transmit the P1-signal in a symbol; however, the UE 420 may report to the BS 410 the time at which it observed the signal. For example, the UE 420 may report the symbol index in which the P1-signal was successfully received to the BS 410. The BS 410 may receive this report and determine which BS TX beam the BS 410 used at the indicated time. In some examples, the UE 420 measures signal quality of the P1-signal, such as reference signal receive power (RSRP) or another signal quality parameter (e.g., SNR, channel flatness, etc.). The UE 420 may report the measured signal quality (e.g., RSRP) to the BS 410 together with the symbol index. In some cases, the UE 420 may report multiple symbol indices to the BS 410, corresponding to multiple BS TX beams.

As a part of a beam management procedure, the BPL used between a UE 420 and BS 110 may be refined/changed. For example, the BPL may be refined periodically to adapt to changing channel conditions, for example, due to movement of the UE 420 or other objects, fading due to Doppler spread, etc. The UE 420 can monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

As shown in FIG. 4, for P2 procedure, the BS 410 transmits symbols of a signal with different BS-beams (e.g., TX beams 415, 414, 413) that are spatially close to the B S-beam of the current BPL. For example, the BS 410 transmits the signal in different symbols using neighboring TX beams (e.g., beam sweeps) around the TX beam of the current BPL. As shown in FIG. 4, the TX beams used by the BS 410 for the P2 procedure may be different from the TX beams used by the BS 410 for the P1 procedure. For example, the TX beams used by the BS 410 for the P2 procedure may be spaced closer together and/or may be more focused (e.g., narrower) than the TX beams used by the BS 410 for the P1 procedure. During the P2 procedure, the UE 420 keeps its RX beam (e.g., RX beam 424) constant. The UE 420 may measure the signal quality (e.g., RSRP) of the signal in the different symbols and indicate the symbol in which the highest signal quality was measured. Based on the indication, the BS 410 can determine the strongest (e.g., best, or associated with the highest signal quality) TX beam (i.e., the TX beam used in the indicated symbol). The BPL can be refined accordingly to use the indicated TX beam.

As shown in FIG. 4, for P3 procedure, the BS 420 maintains a constant TX beam (e.g., the TX beam of the current BPL) and transmits symbols of a signal using the constant TX beam (e.g., TX beam 414). During the P3 procedure, the UE 420 scans the signal using different RX beams (e.g., RX beams 423, 424, 425) in different symbols. For example, the UE 420 may perform a sweep using neighboring RX beams to the RX beam in the current BPL (i.e., the BPL being refined). The UE 420 may measure the signal quality (e.g., RSRP) of the signal for each RX beam and identify the strongest UE RX beam. The UE 420 may use the identified RX beam for the BPL. The UE 420 may report the signal quality to the BS 410.

Example Sidelink Scenarios

In some circumstances, two or more subordinate entities (e.g., user equipments (UEs)) may communicate with each other using sidelink (SL) signals. Real-world applications of such SL communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a SL signal may refer to a signal communicated from one subordinate entity (e.g., a UE1) to another subordinate entity (e.g., a UE2) without relaying that communication through a scheduling entity (e.g., a UE or a BS), even though the scheduling entity may be utilized for scheduling and/or control purposes. In some examples, the SL signals may be communicated using a licensed spectrum (unlike wireless local area networks, which typically use an unlicensed spectrum).

Figures 5A, 5B:
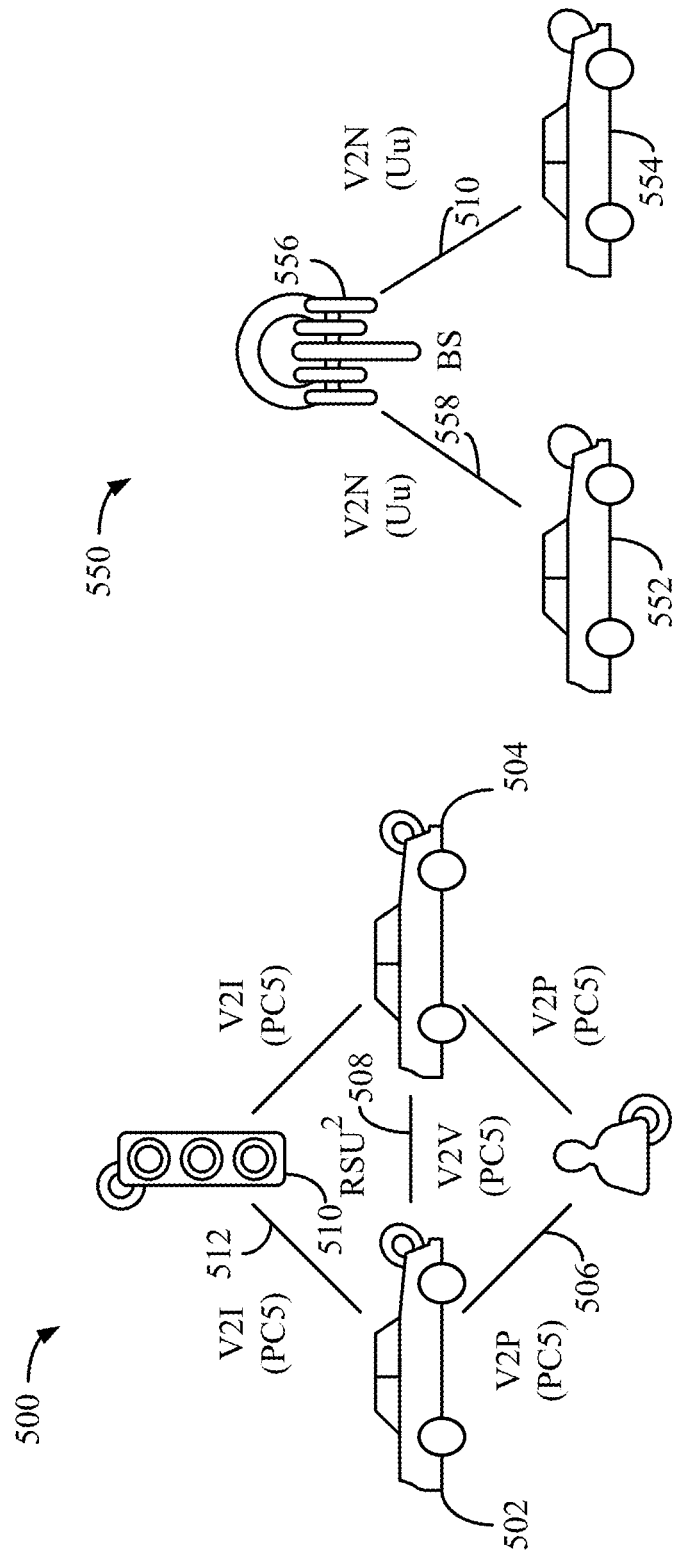
FIGS. 5A and 5B show diagrammatic representations of example vehicle to everything (V2X) systems in accordance with certain aspects of the present disclosure.

FIGS. 5A and 5B show diagrammatic representations of example vehicle to everything (V2X) systems, in accordance with certain aspects of the present disclosure. For example, vehicles shown in FIGS. 5A and 5B may communicate via sidelink channels and may perform SL channel state information (CSI) reporting as described herein.

The V2X systems described in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including V2V communications) is illustrated with two vehicles 502, 504. The first transmission mode allows for direct communication between different participants in a given geographic location. As illustrated, a vehicle can have a wireless communication link 506 with an individual (V2P) (for example, via a UE) through a PC5 interface. Communications between the vehicles 502 and 504 may also occur through a PC5 interface 508. In a like manner, communication may occur from a vehicle 502 to other highway components (for example, highway component 510), such as a traffic signal or sign (V2I) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system 500 may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (BS) (for example, an eNB or gNB), that sends and receives information to and from (for example, relays information between) the vehicles 552, 554. The network communications through vehicle to network (V2N) links 558 and 510 may be used, for example, for long range communications between the vehicles 552, 554, such as for communicating the presence of a car accident a distance ahead along a road or highway. Other types of communications may be sent by a node to the vehicles 552, 554, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using SL signals. As described above, V2V and V2X communications are examples of communications that may be transmitted via a SL. Other applications of SL communications may include public safety or service announcement communications, communications for proximity services, communications for UE-to-network relaying, device-to-device (D2D) communications, IoE communications, IoT communications, mission-critical mesh communications, among other suitable applications. Generally, a SL may refer to a direct link between one subordinate entity (for example, a UE1) and another subordinate entity (for example, a UE2). As such, a SL may be used to transmit and receive a communication (also referred to herein as a "SL signal") without relaying the communication through a scheduling entity (for example, a BS), even though the scheduling entity may be utilized for scheduling or control purposes. In some examples, a SL signal may be communicated using a licensed spectrum (unlike wireless local area networks, which typically use an unlicensed spectrum).

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. New radio (NR) SL supports for a UE a case where all the symbols in a slot are available for SL, as well as another case where only a subset of consecutive symbols in a slot is available for SL.

PSFCH may carry feedback such as CSI related to a SL channel quality. A sequence-based PSFCH format with one symbol (not including automatic gain control (AGC) training period) may be supported. The following formats may be possible: a PSFCH format based on PUCCH format 2 and a PSFCH format spanning all available symbols for SL in a slot.

Figure 6:
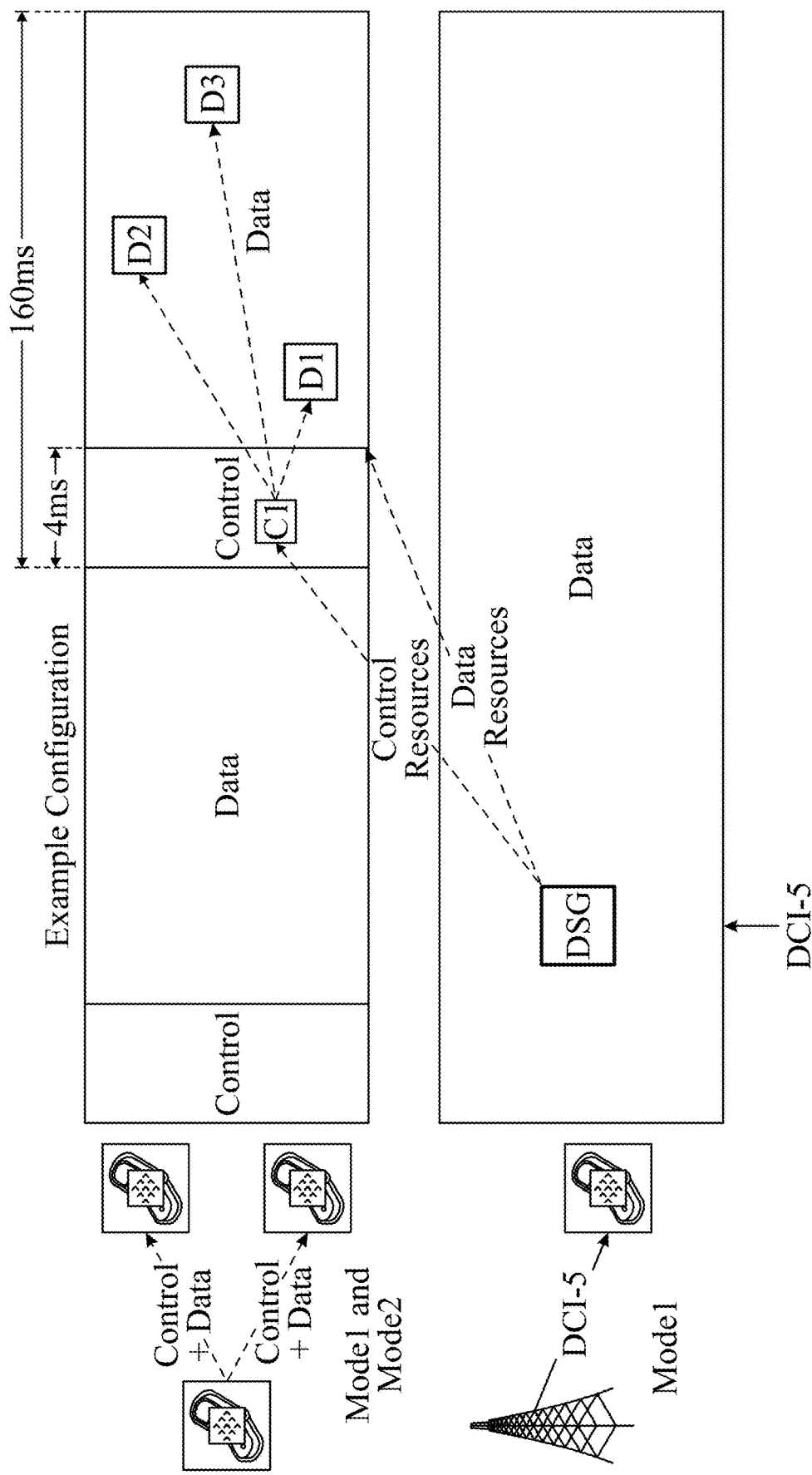
FIG. 6 illustrate example sidelink (SL) communications modes, in accordance with certain aspects of the present disclosure.

FIG. 6 provides an overview of SL communications (broadcast and groupcast device-to-device or D2D) between UEs. As noted above, with reference to FIGS. 5A and 5B, SL generally refers to a link between two users or user-relays and can be used in different scenarios and for different applications.

For example, for applications with in-coverage operation, both users are in a gNodeB (gNB) coverage, but directly communicate. The in-coverage operation can be assumed for enabling some gaming applications. For applications with partial-coverage operation, one UE is in-coverage, and acts as a relay to extend the coverage for other users. For application with out-of-coverage operation, users are outside the gNB coverage, but still need to communicate. The out-of-coverage operation is important for mission critical applications, such as V2X and public safety.

As illustrated in FIG. 6, resource allocation for SL communications can be done in different ways. In a first mode, such as a Mode 1, the gNB schedules SL resources to be used by the UE for SL transmission.

For a second mode, such as a Mode 2, the UE determines SL resources (the gNB does not schedule SL transmission resources within SL resources configured by the gNB/network). The UE autonomously selects the SL resources for transmission. The UE can assist in SL resource selection for other UEs. The UE may be configured with an NR configured grant (CG) for SL transmission and the UE may schedule SL transmissions for other UEs.

Example Quasi Co-Location (QCL) Signaling

In many cases, it is important for a user equipment (UE) to know which assumptions the UE can make on a channel corresponding to different transmissions. For example, the UE may need to know which reference signals (RSs) the UE can use to estimate the channel in order to decode a transmitted signal (e.g., a physical downlink control channel (PDCCH) or a physical downlink shared channel (PDSCH)). It may also be important for the UE to be able to report relevant channel state information (CSI) to a base station (BS) (e.g., gNB) for scheduling, link adaptation, and/or beam management purposes. In new radio (NR), the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between downlink (DL) RSs in one channel state information RS CSI-RS set and the PDSCH demodulation RS (DMRS) ports.

In some cases, a UE may be configured with up to M TCI-States. Configuration of the M TCI-States can come about via higher layer signaling, while the UE may be signalled to decode the PDSCH according to a detected PDCCH with downlink control information (DCI) indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide QCL signaling for RS and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may in some scenarios depend on or be a function of other information. For example, the QCL types indicated to a UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help the UE to select an analog receive (Rx) beam (e.g., during beam management procedures). For example, a synchronization signal (SS) block resource indicator may indicate a same beam for a previous reference signal should be used for a subsequent transmission.

As illustrated in FIG. 7, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
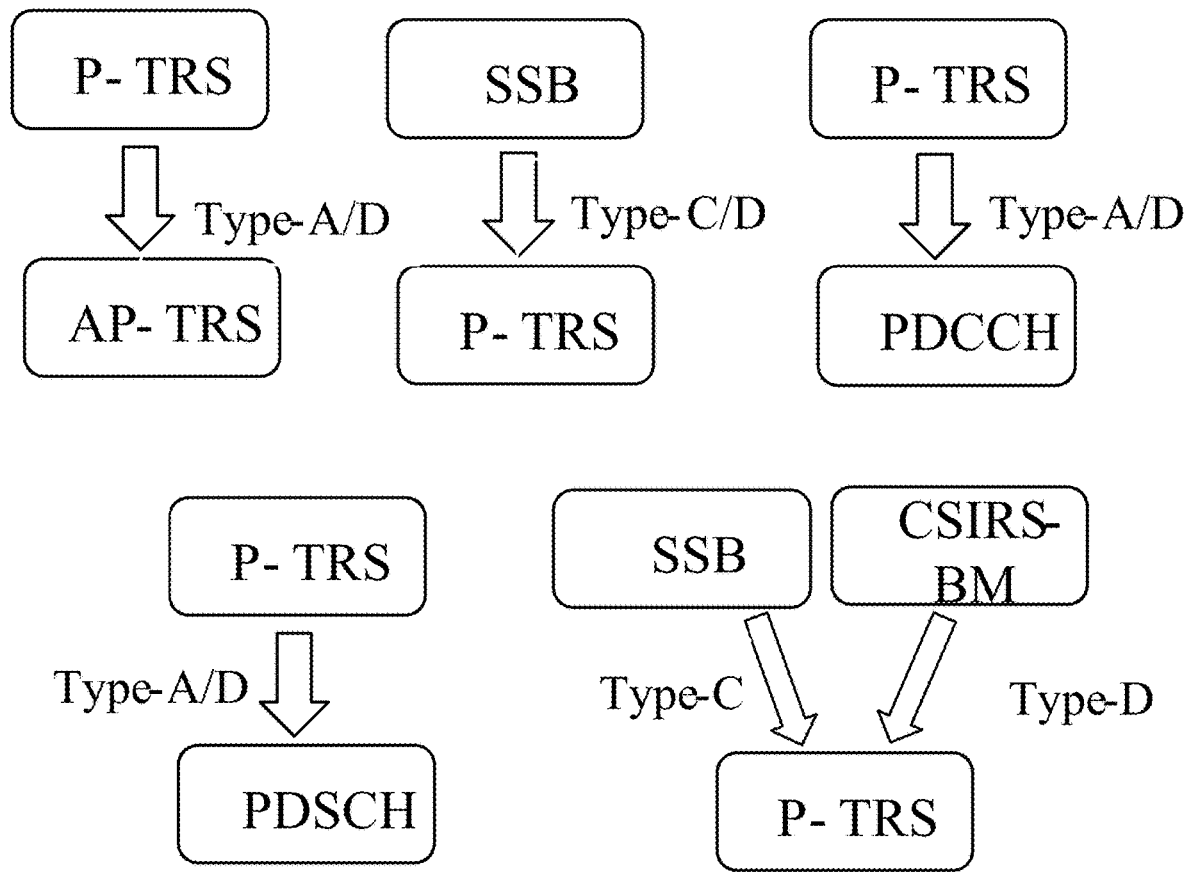
FIG. 8 graphically illustrates example QCL relationships between source and target reference signals, in accordance with certain aspects of the present disclosure.

FIG. 8 illustrate examples of association of DL RSs with corresponding QCL types that may be indicated by a TCI-RS-SetConfig.

In the examples of FIG. 8, a source RS is indicated in a top block and is associated with a target signal indicated in a bottom block. In this context, a target signal refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: a physical uplink shared channel (PUSCH) DMRS, a CSI-RS, a tracking RS (TRS), and a sounding RS (SRS).

As illustrated, each TCI-RS-SetConfig contains parameters. These parameters can, for example, configure QCL relationship(s) between RSs in the RS set and the DM-RS port group of the PDSCH. The RS set contains a reference to either one or two DL RSs and an associated QCL-Type for each one configured by the higher layer parameter QCL-Type.

As illustrated in FIG. 8, for the case of two DL RSs, the QCL types can take on a variety of arrangements. For example, the QCL types may not be the same, regardless of whether the references are to the same DL RS or different DL RSs. In the illustrated example, the SSB is associated with Type C QCL for P-TRS, while the CSI-RS for beam management (CSIRS-BM) is associated with Type D QCL.

Example QCL Source Selection and Indication on Sidelink

Aspects of the present disclosure relate to wireless communications, and more particularly, to techniques for selecting and indicating a quasi co-location (QCL) source signal for sidelink (SL) communications. As noted above, a QCL source indication may allow a user equipment (UE) to determine a receiver beam (RX beam) or transmit beam (TX beam) to use to receive or transmit on a SL interface.

FIG. 9 summarizes possible QCL sources for beam indication for new radio (NR) cellular (Uu) interface. As shown, according to a first option, the beam indication for some transmissions may be trained directly, meaning a beam may be indicated by a signal in the same direction (e.g., a RX beam may be trained directly with a downlink (DL) signal, while a TX beam may be trained directly with an uplink (UL) signal). According to a second option ("vice-versa"), a beam in one direction may be trained with a signal in another direction (e.g., a RX beam may be trained with an UL signal, while a TX beam may be trained with a DL signal).

As shown, for reception (DL RX), physical downlink control channel (PDCCH) and physical downlink shared channel (PDSCH) can be indicated, via transmission configuration indicator (TCI)-state configuration, to be spatially QCL'ed ("QCL-D'ed") with signals including synchronization signal block (SSB) and channel state information reference signal (CSI-RS). In other words, this QCL indication means a UE can receive PDCCH and/or PDSCH with the same RX beam it uses for the SSB and/or the CSI-RS.

For UL transmissions (UL TX), signals such as physical uplink control channel (PUCCH), physical uplink shared channel (PUSCH), and/or sounding reference signal (SRS), can be indicated as QCL-D'ed with SSB and/or CSI-RS (e.g., assuming channel reciprocity) or SRS (via signalSpatialRelationInfo configuration signaling). In other words, this QCL indication means the UE can transmit PUCCH, PUSCH, or SRS with the same RX beam used to receive the SSB or the CSI-RS, or with the same TX beam used for SRS transmissions.

As indicated in FIG. 9, reciprocal "vice-versa" training of beams in one direction based on signals in the other direction may have limited applicability in Uu applications. This may be due to the differences between gNB and UE transmission characteristics (such as different transmission power and different knowledge of transmission schedules).

Aspects of the present disclosure provide mechanisms to signal spatial QCL sources that can be used as a bean indication for SL communications. In some cases, the mechanisms may take advantage of relative similarities between UEs communicating via a SL and/or differences (such as when one UE is performing or has performed a beam sweep).

Figure 10:
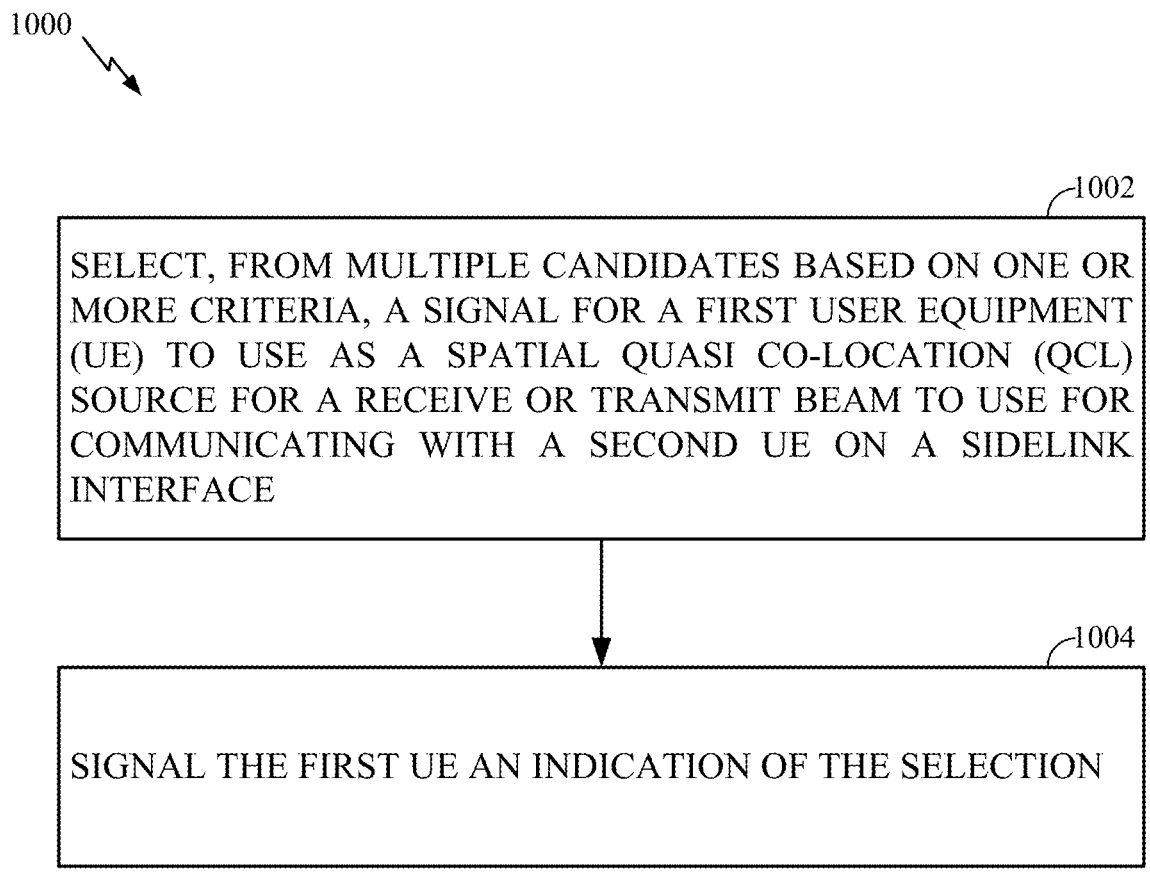
FIG. 10 is a flow diagram illustrating example operations that may be performed by a scheduling node, in accordance with certain aspects of the present disclosure.

FIG. 10 is a flow diagram illustrating example operations 1000 that may be performed by a scheduling node, in accordance with certain aspects of the present disclosure. Operations 1000 may be performed by any node performing a scheduling function, such as a gNB (e.g., such as the BS 110a in FIG. 1 or FIG. 2) or a SL node (e.g., actually participating in the corresponding SL communications with another SL node). The SL node may be a UE (e.g., such as the UE 120a in FIG. 1 or FIG. 2).

Operations 1000 begin, at 1002, by selecting, from multiple candidates based on one or more criteria, a signal for a first UE to use as a spatial QCL source for a receive or transmit beam to use for communicating with a second UE on a SL interface.

At 1004, the scheduling node signals the first UE an indication of the selection.

FIG. 11 is a flow diagram illustrating example operations 1100 that may be performed by a first UE (e.g., a SL node), in accordance with certain aspects of the present disclosure. Operations 1100 may be considered complementary to operations 1000. For example, operations 1100 may be performed by the SL node to determine a beam to use for SL communications scheduled by a scheduling node performing operations 1000. The SL node may be a UE (e.g., such as the UE 120a in FIG. 1 or FIG. 2).

Operations 1100 begin, at 1102, by receiving signaling from the scheduling node indicating a selection, from multiple candidates based on one or more criteria, of a signal for the first UE to use as a spatial QCL source for a RX or TX beam to use for communicating with a second UE on a SL interface.

At 1104, the first UE communicates with the second UE on the SL interface with a RX or TX beam determined based on the indicated selection.

In some cases, a SL receive (SL Rx) for one UE (e.g., UE2 in FIG. 12) may be indicated based on either another SL signal that UE has to receive (e.g., similar to the Option1 case for the Uu table of FIG. 9). In other cases, the SL RX beam may be indicated based on another SL signal that the UE transmits (e.g., similar to the "vice-versa" case shown as Option 2 case for the Uu table of FIG. 9).

In some cases, a SL transmit (SL TX) beam for UE2 may also be based on another TX channel from UE2 (similar to the "trained directly" case for Uu, i.e., Option1 in the table) or on UE2's SL RX beam (similar to the "vice-versa" case for Uu, i.e., Option2 in the table).

Figure 12:
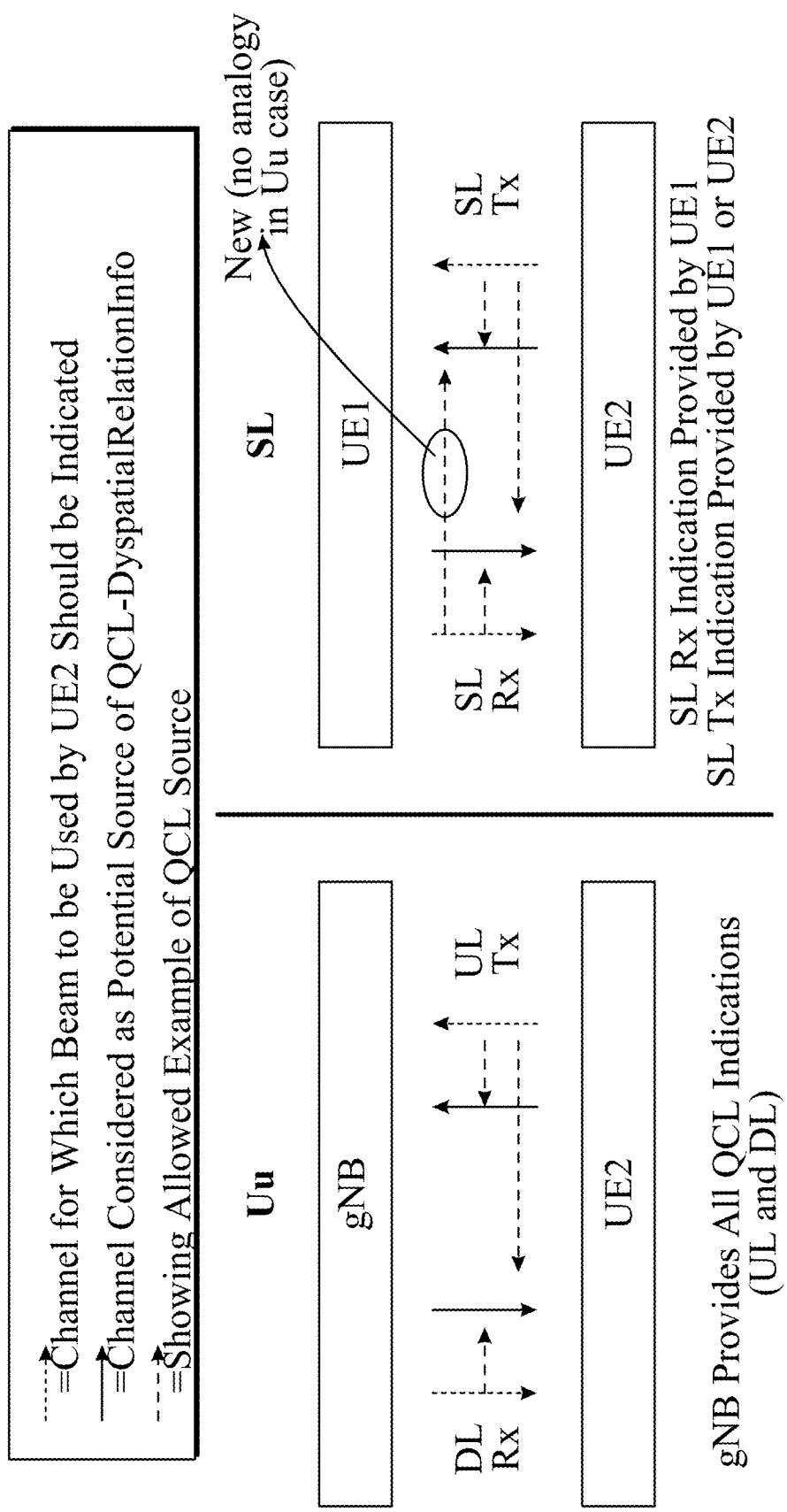
FIG. 12 illustrates an example of possible spatial QCL sources for a SL interface, in accordance with certain aspects of the present disclosure.

The mechanisms proposed herein for indicating a spatial QCL (QCL-D) source may be explained with reference to FIG. 12, using UE2 as a reference point for the SL RX and SL TX beams. The left side of FIG. 12 shows an example for Uu signaling, between a gNB and UE2, in which the gNB provides the QCL indications. As illustrated by the dashed line, for DL RX beam indication, a DL signal may be used as the QCL source. For UL TX beam indication, as illustrated by the two dashed lines, an UL signal (per Option 1) or a DL signal (per Option 2) may be used as the QCL source.

The right side of FIG. 12 shows an example for SL signaling, between two UEs, UE1 and UE2. As illustrated by the two dashed lines, for SL RX beam indication, a signal transmitted from UE1 to UE2 or a signal transmitted from UE2 to UE1 may be used as the QCL source. Similarly, for SL TX beam indication, as illustrated by the two dashed lines, an UL signal (per Option 1) or a DL signal (per Option 2) may be used as the QCL source.

In some cases, the spatial QCL source information signaling may be conveyed (by a scheduling node), in a similar manner as for Uu, which uses TCI state information for DL or spatial relation information for UL, but with adaptation for SL (which has no notion of UL and DL). As noted above, the scheduling node could be a gNB or one of the UEs (e.g., UE1 or UE2) participating in the SL communications.

Referring again to FIG. 12, for an SL RX beam, with UE2 receiving from UE1, the beam indication may have multiple QCL-D source candidates. A first candidate QCL source may be a signal (e.g., a channel or a reference signal) transmitted from UE1 to UE2. A second candidate QCL source may be a signal transmitted from UE2 to UE1 (e.g., analogous to vice-versa Option 2 of FIG. 9). For this candidate option, there is currently no analogous Uu DL option, as there is currently no mechanism for a DL RX beam to be indicated based on an UL TX beam.

For an SL TX beam, with UE2 transmitting to UE1, the beam indication may also have multiple QCL-D source candidates. A third candidate QCL source may be a signal transmitted from UE1 to UE2 (analogous to Uu Option-2 of FIG. 9). There is currently no analogous option for Uu DL, as there is currently no signaling mechanism for a DL Tx beam to be indicated based on an UL RX beam. A fourth candidate QCL source may be a signal transmitted from UE2 to UE1 (e.g., analogous to Uu Option-1).

Which candidate spatial QCL source is chosen (by a scheduling node) may be based on one or more selection criteria. With SL, UL/DL beam correspondence may be based on channel reciprocity and similar transmission characteristics of UEs.

In some cases, one or more criteria may be applied so that a candidate QCL source is selected based on the relative channel quality, from the perspective of one UE to the other UE. For example, the criteria may be designed so the second or fourth candidate spatial QCL sources are chosen when UE1 is able to receive from UE2 with high quality (UE1 can "hear UE2's Tx" with high quality), and to select the first or third candidate spatial QCL sources when UE2 can receive from UE1 with high quality. One example where one UE can receive from the other with higher quality than vice-versa is when one UE has a higher TX-power capacity than the other UE.

One procedure to enable the various signaling mechanism options described herein is as follows. First, the UEs may be configured to transmit signals allowing measurements such that the selection criteria to be applied. For example, UE1 and/or UE2 may be configured to transmit their reference signals (e.g., SSB or CSI-RS) periodically. A scheduling node may dynamically choose between the various options for RX/TX beam indication.

As noted above, either UE1, UE2, or a gNB (serving UE1 or UE2) can serve as a scheduler. For example, if UE1 is the scheduler, UE1 dynamically selects a candidate spatial QCL source based on recent measurements (e.g., based on a comparison of recent UE1 to UE2 reference-signal quality reported from UE2 relative to UE2 to UE1 reference-signal quality measured at UE1).

UE1 may then signal the scheduled option/selected candidate (on QCL-D source) to UE2 for the RX/TX beam indication.

Another option for selection criteria may be designed to try and conserve beam training resources. For example, if one UE has already been sweeping (or has recently swept) its broad-beams on SL (e.g., similar to Uu P1 procedure described with reference to FIG. 4), then the selected QCL source may be the already being-swept (recently swept) signal/channel from the UE in order to save beam-training effort. In this case, there may be no need for dynamic scheduling.

In some cases, rather than use signals between UE1 and UE2 as a spatial QCL reference source, signals to/from some type of reference node (e.g., node X) may be used. For example, signals between node X and UE2 may be used as a spatial QCL source for SL transmissions between UE1 and UE2. For example, node X may be another UE or a gNB (e.g., a serving gNB of UE1 or UE2 or both). In this case, some type of additional ("side") information (e.g., based on relative positions of node X, UE1, and UE2) could be used to deduce that beams between node X and UE2 will also be good for communication between UE1 and UE2 as well. In this case, the QCL indications may also come from node X to save beam-training effort.

Various types of signaling may be used to enable the spatial QCL source signaling mechanisms described herein. For example, if a gNB is involved, Uu signaling of measurement results may be sent to a scheduling node via radio resource control (RRC), medium access control (MAC) control element (CE), PUCCH, or PUSCH. Equivalent (or similar) SL signaling mechanisms for RRC/MAC-CE/PUCCH/PUSCH/PDSCH (such as PSCCH, PSSCH) may be used to send measurement results between UEs.

RRC/MAC-CE/DCI/PDSCH may be used to convey spatial QCL source for bean indication (over Uu). Similarly, SL analogous signaling to RRC/MAC-CE/DCI/PUCCH/PUSCH/PDSCH (e.g., PSCCH or PSSCH) may be used to convey QCL source equivalents (over SL).

Figure 13:
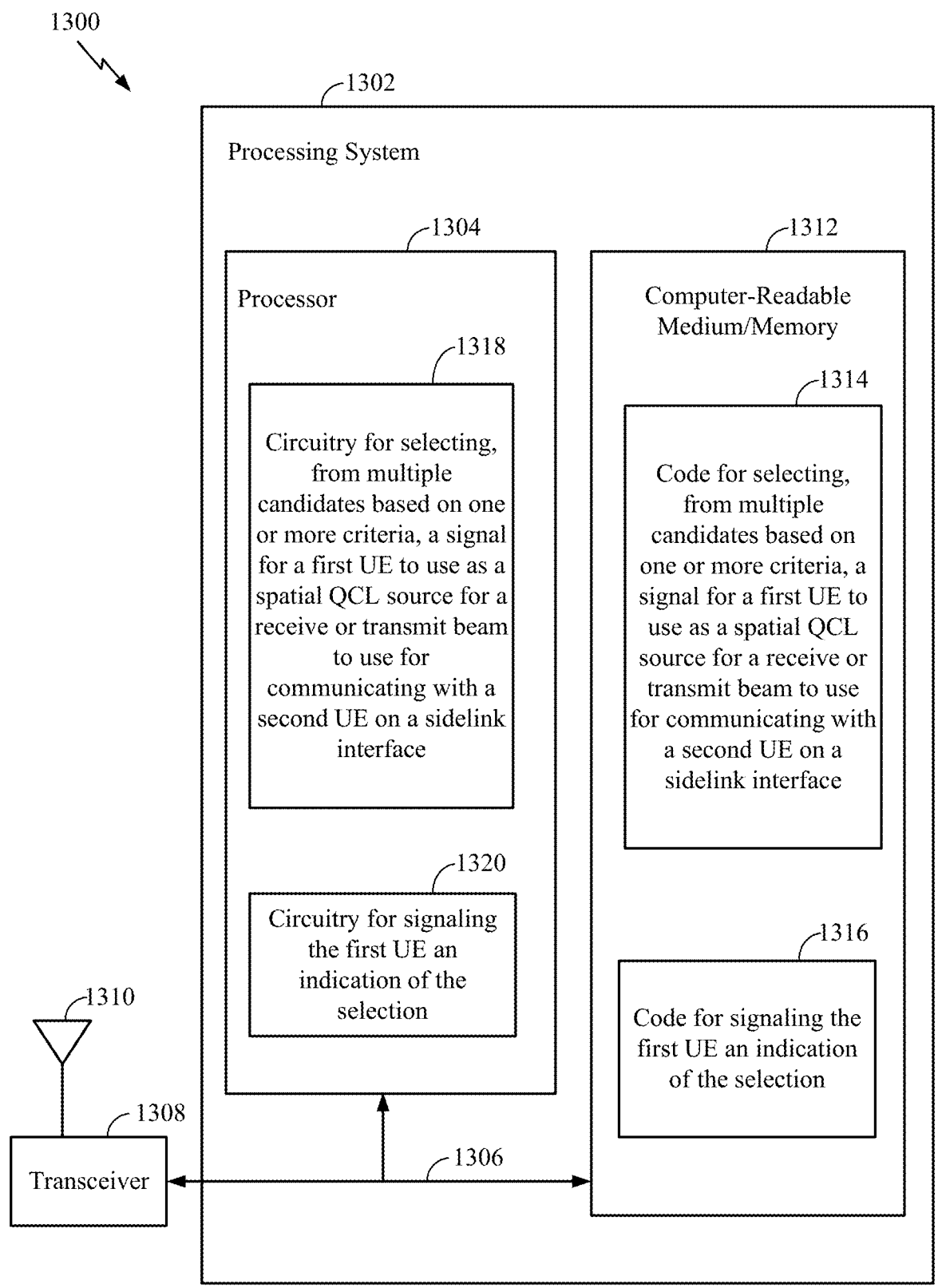
FIG. 13 illustrates a communications device that may include various components configured to perform operations for techniques disclosed herein, according to aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for selecting and code 1316 for signaling. The code 1314 for selecting may include code for selecting from multiple candidates based on one or more criteria a signal for a first UE to use as a spatial source for a RX or TX beam to use for communicating with a second UE on a SL interface. The code 1316 for signaling may include code for signaling the first UE an indication of the selection.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1318 for selecting and circuitry 1320 for signaling. The circuitry 1318 for selecting may include circuitry for selecting from multiple candidates based on one or more criteria a signal for a first UE to use as a spatial source for a RX or TX beam to use for communicating with a second UE on a SL interface.

The circuitry 1320 for signaling may include circuitry for signaling the first UE an indication of the selection.

Figure 14:
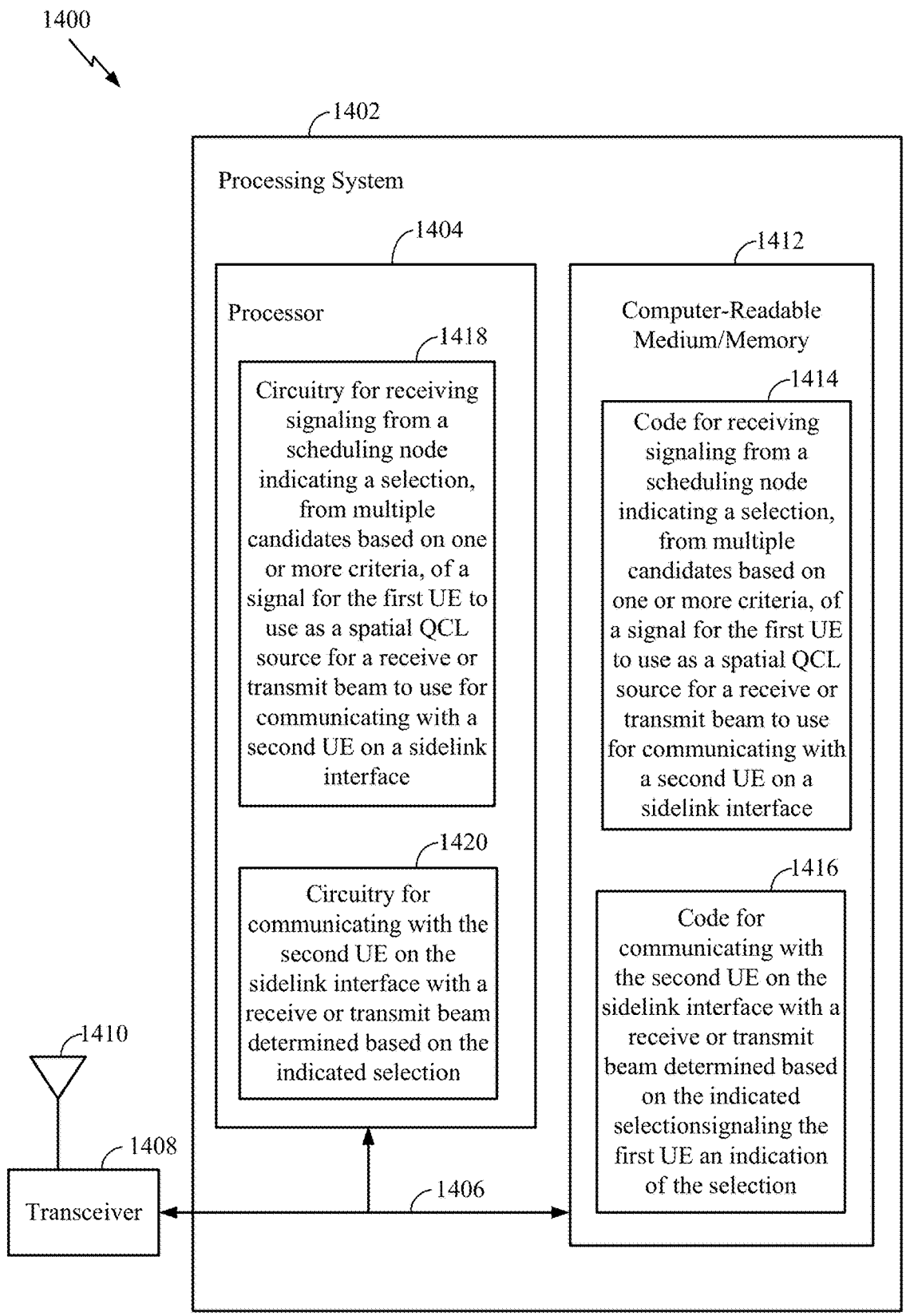
FIG. 14 illustrates a communications device that may include various components configured to perform operations for techniques disclosed herein, according to aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 11, or other operations for performing the various techniques discussed herein. In certain aspects, computer-readable medium/memory 1412 stores code 1414 for receiving and code 1416 for communicating. The code 1414 for receiving may include code for receiving signaling from a scheduling node indicating a selection, from multiple candidates based on one or more criteria, of a signal for the first UE to use as a spatial QCL source for a RX or TX beam to use for communicating with a second UE on a SL interface. The code 1416 for communicating may include code for communicating with the second UE on the SL interface with RX or TX beam determined based on the indicated selection.

The processor 1404 may include circuitry configured to implement the code stored in the computer-readable medium/memory 1412, such as for performing the operations illustrated in FIG. 11, as well as other operations for performing the various techniques discussed herein. For example, the processor 1404 includes circuitry 1418 for receiving and circuitry 1420 for communicating. The circuitry 1418 for receiving may include circuitry for receiving signaling from a scheduling node indicating a selection, from multiple candidates based on one or more criteria, of a signal for the first UE to use as a spatial QCL source for a RX or TX beam to use for communicating with a second UE on a SL interface. The circuitry 1420 for communicating may include circuitry for communicating with the second UE on the SL interface with RX or TX beam determined based on the indicated selection.

Example Aspects

In a first aspect, a method for wireless communications performed by a scheduling node comprises selecting, from multiple candidates based on one or more criteria, a signal for a first user equipment (UE) to use as a spatial quasi co-location (QCL) source for a receive or transmit beam to use for communicating with a second UE on a sidelink interface; and signaling the first UE an indication of the selection.

In a second aspect, alone or in combination with the first aspect, the scheduling node also signals the second UE an indication of the selection.

In a third aspect, alone or in combination with one or more of the first and second aspects, the signal selected for the first UE to use as a spatial QCL source comprises a reference signal or a channel.

In a fourth aspect, alone or in combination with one or more of the first through third aspects, the candidates include at least one of: a first candidate for the first UE to use a signal transmitted from the first UE to the second UE as a QCL source for a receive beam for receiving a transmission from the second UE; or a second candidate for the first UE to use a signal transmitted from the second UE to the first UE as a QCL source for a transmit beam for sending a transmission to the second UE.

In a fifth aspect, alone or in combination with one or more of the first through fourth aspects, the candidates include at least one of: a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

In a sixth aspect, alone or in combination with one or more of the first through fifth aspects, the scheduling node comprises the second UE or a base station.

In a seventh aspect, alone or in combination with one or more of the first through sixth aspects, at least one of the criteria involves a difference in: a first sidelink channel quality measured based on a signal transmitted from the first UE to the second UE; and a second sidelink channel quality measured based on a signal transmitted from the second UE to the first UE.

In an eighth aspect, alone or in combination with one or more of the first through seventh aspects, the scheduling node: indicates the first UE should use a signal transmitted from the first UE to the second UE as the spatial QCL source if the first sidelink channel quality is greater than the second sidelink channel quality; or indicates the first UE should use a signal transmitted from the second UE to the first UE as the spatial QCL source if the second sidelink channel quality is greater than the first sidelink channel quality.

In a ninth aspect, alone or in combination with one or more of the first through eighth aspects, at least one of the criteria considers whether the first UE or second UE is currently, or has recently completed, beam sweeping transmissions on the sidelink.

In a tenth aspect, alone or in combination with one or more of the first through ninth aspects, the scheduling node: indicates the first UE should use a signal transmitted from the first UE to the second UE as the spatial QCL source if the first UE is currently, or has recently completed, beam sweeping transmissions on the sidelink; or indicates the first UE should use a signal transmitted from the second UE to the first UE as the spatial QCL source if the second UE is currently, or has recently completed, beam sweeping transmissions on the sidelink.

In an eleventh aspect, alone or in combination with one or more of the first through tenth aspects, the candidates include: at least one candidate for the first UE to use a signal transmitted between the first UE and a reference node different than second UE as a QCL source for a receive beam or a transmit beam to communicate with the second UE.

In a twelfth aspect, alone or in combination with one or more of the first through eleventh aspects, at least one of the criteria considers a relative positions of the reference node, first UE, and second UE.

In a thirteenth aspect, alone or in combination with one or more of the first through twelfth aspects, the scheduling node comprises the second UE or the reference node.

In a fourteenth aspect, alone or in combination with one or more of the first through thirteenth aspects, the scheduling node makes the selection based on measurement results received by the scheduling node: via at least one of RRC signaling, a MAC CE, PUCCH, or PUSCH, if forwarded via a cellular interface; or via at least one of sidelink equivalents or similar signaling mechanisms as RRC signaling and a MAC CE, PSCCH, and PSSCH, if forwarded via a sidelink interface.

In a fifteenth aspect, alone or in combination with one or more of the first through fourteenth aspects, the scheduling node signals the first UE an indication of the selected option: via at least one of RRC signaling, a MAC CE, DCI, or PDSCH, if received via a cellular interface; or via at least one of sidelink equivalents or similar signaling mechanisms as RRC signaling and a MAC CE, PSCCH, and PSSCH, if received via a sidelink interface.

In a sixteenth aspect, a method for wireless communications performed by a first UE comprising: receiving signaling from a scheduling node indicating a selection, from multiple candidates based on one or more criteria, of a signal for the first user equipment (UE) to use as a spatial quasi co-location (QCL) source for a receive or transmit beam to use for communicating with a second UE on a sidelink interface; and communicating with the second UE on the sidelink interface with a receive or transmit beam determined based on the indicated selection.

In a seventeenth aspect, alone or in combination with the sixteenth aspect, the signal selected for the first UE to use as a spatial QCL source comprises a reference signal or a channel.

In an eighteenth aspect, alone or in combination with one or more of the sixteenth and seventeenth aspects, the scheduling node comprises the second UE or a base station.

In a nineteenth aspect, alone or in combination with one or more of the sixteenth through eighteenth aspects, the signaling: indicates the first UE should use a signal transmitted from the first UE to the second UE as the spatial QCL source; or indicates the first UE should use a signal transmitted from the second UE to the first UE as the spatial QCL source.

In a twentieth aspect, alone or in combination with one or more of the sixteenth through nineteenth aspects, the candidates include at least one of: a first candidate for the first UE to use a signal transmitted from the first UE to the second UE as a QCL source for a receive beam for receiving a transmission from the second UE; or a second candidate for the first UE to use a signal transmitted from the second UE to the first UE as a QCL source for a transmit beam for sending a transmission to the second UE.

In a twenty-one aspect, alone or in combination with one or more of the sixteenth through twentieth aspects, the candidates include at least one of: a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

In a twenty-second aspect, alone or in combination with one or more of the sixteenth through twenty-first aspects, the candidates include: at least one candidate for the first UE to use a reference signal transmitted between the first UE and a reference node different than second UE as a QCL source for a receive beam or a transmit beam to communicate with the second UE.

In a twenty-third aspect, alone or in combination with one or more of the sixteenth through twenty-second aspects, the scheduling node makes the selection based on measurement results transmitted from the first UE: via at least one of RRC signaling, a MAC CE, PUCCH, or PUSCH, if forwarded via a cellular interface; or via at least one of sidelink equivalents or similar signaling mechanisms as RRC signaling and a MAC CE, PSCCH, and PSSCH, if forwarded via a sidelink interface.

In a twenty-fourth aspect, alone or in combination with one or more of the sixteenth through twenty-second aspects, the signaling from the scheduling node indicating the selection is received: via at least one of RRC signaling, a MAC CE, DCI, or PDSCH, if received via a cellular interface; or via at least one of sidelink equivalents or similar signaling mechanisms as RRC signaling and a MAC CE, PSCCH, and PSSCH, if received via a sidelink interface.

In a twenty-fifth aspect, an apparatus for wireless communications performed by a scheduling node, comprising: at least one processor and a memory configured to: select, from multiple candidates based on one or more criteria, a signal for a first user equipment (UE) to use as a spatial quasi co-location (QCL) source for a receive or transmit beam to use for communicating with a second UE on a sidelink interface; and signal the first UE an indication of the selection.

In a twenty-sixth aspect, alone or in combination with the twenty-fifth aspect, the candidates include at least one of: a first candidate for the first UE to use a signal transmitted from the first UE to the second UE as a QCL source for a receive beam for receiving a transmission from the second UE; or a second candidate for the first UE to use a signal transmitted from the second UE to the first UE as a QCL source for a transmit beam for sending a transmission to the second UE.

In a twenty-seventh aspect, alone or in combination with one or more of the twenty-fifth and twenty-sixth aspects, the candidates include at least one of: a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

In a twenty-eighth aspect, an apparatus for wireless communications performed by a first user equipment (UE) comprises: at least one processor and a memory configured to: receive signaling from a scheduling node indicating a selection, from multiple candidates based on one or more criteria, of a signal for the first UE to use as a spatial quasi co-location (QCL) source for a receive or transmit beam to use for communicating with a second UE on a sidelink interface; and communicate with the second UE on the sidelink interface with a receive or transmit beam determined based on the indicated selection.

In a twenty-ninth aspect, alone or in combination with the twenty-eighth aspect, the candidates include at least one of: a first candidate for the first UE to use a signal transmitted from the first UE to the second UE as a QCL source for a receive beam for receiving a transmission from the second UE; or a second candidate for the first UE to use a signal transmitted from the second UE to the first UE as a QCL source for a transmit beam for sending a transmission to the second UE.

In a thirtieth aspect, alone or in combination with one or more of the twenty-eighth and twenty-ninth aspects, the candidates include at least one of: a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 10 and 11 may be performed by various processors shown in FIG. 2 of the BS 110 and/or UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a scheduling node, comprising:
    selecting, from multiple candidates based on one or more criteria, a signal for a first user equipment (UE) to use as a spatial quasi co-location (QCL) source for a receive or transmit beam to use for communicating with a second UE on a sidelink interface, wherein the multiple candidates comprise a first signal from the first UE to the second UE with a first signal quality and a second signal from the second UE to the first UE with a second signal quality, and wherein the one or more criteria indicate use of the first signal as the QCL source when the first signal quality is higher than the second signal quality or the second signal as the QCL source when the second signal quality is higher than the first signal quality; and
    signaling the first UE an indication of the selection.

2. The method of claim 1, wherein the scheduling node also signals the second UE an indication of the selection.

3. The method of claim 1, wherein the signal selected for the first UE comprises a reference signal or a channel.

4. The method of claim 1, wherein the candidates include at least one of:
    a first candidate for the first UE to use a signal transmitted from the first UE to the second UE as a QCL source for a receive beam for receiving a transmission from the second UE; or
    a second candidate for the first UE to use a signal transmitted from the second UE to the first UE as a QCL source for a transmit beam for sending a transmission to the second UE.

5. The method of claim 1, wherein the candidates include at least one of:
    a first candidate for the first UE to use a signal transmitted from the second UE to the first UE as a QCL source for a receive beam for receiving a transmission from the second UE; or
    a second candidate for the first UE to use a signal transmitted from the first UE to the second UE as a QCL source for a transmit beam for sending a transmission to the second UE.

6. The method of claim 1, wherein the scheduling node comprises the second UE or a base station.

7. The method of claim 1, wherein at least one of the criteria involves a difference in:
    a first sidelink channel quality measured based on a signal transmitted from the first UE to the second UE; and
    a second sidelink channel quality measured based on a signal transmitted from the second UE to the first UE.

8. The method of claim 7, wherein the scheduling node: indicates the first UE should use a signal transmitted from the first UE to the second UE as the spatial QCL source if the first sidelink channel quality is greater than the second sidelink channel quality; or indicates the first UE should use a signal transmitted from the second UE to the first UE as the spatial QCL source if the second sidelink channel quality is greater than the first sidelink channel quality.

9. The method of claim 1, wherein at least one of the criteria considers whether the first UE or second UE is currently, or has recently completed, beam sweeping transmissions on the sidelink.

10. The method of claim 9, wherein the scheduling node:

indicates the first UE should use a signal transmitted from the first UE to the second UE as the spatial QCL source if the first UE is currently, or has recently completed, beam sweeping transmissions on the sidelink; or indicates the first UE should use a signal transmitted from the second UE to the first UE as the spatial QCL source if the second UE is currently, or has recently completed, beam sweeping transmissions on the sidelink.

11. The method of claim 1, wherein the candidates include:

at least one candidate for the first UE to use a signal transmitted between the first UE and a reference node different than second UE as a QCL source for a receive beam or a transmit beam to communicate with the second UE.

12. The method of claim 11, wherein at least one of the criteria considers a relative position of the reference node, first UE, and second UE.

13. The method of claim 11, wherein the scheduling node comprises the second UE or the reference node.

14. The method of claim 1, wherein the scheduling node makes the selection based on measurement results received by the scheduling node:

via at least one of radio resource control (RRC) signaling, a medium access control (MAC) control element (CE), physical uplink control channel (PUCCH), or physical uplink shared channel (PUSCH), if forwarded via a cellular interface; or via at least one of sidelink equivalents or similar signaling mechanisms as RRC signaling and a MAC CE, physical sidelink control channel (PSCCH), and physical sidelink shared channel (PS SCH), if forwarded via a sidelink interface.

15. The method of claim 1, wherein the scheduling node signals the first UE an indication of the selected option:

via at least one of radio resource control (RRC) signaling, a medium access control (MAC) control element (CE), downlink control information (DCI), or physical downlink shared channel (PDSCH), if received via a cellular interface; or via at least one of sidelink equivalents or similar signaling mechanisms as RRC signaling and a MAC CE, physical sidelink control channel (PSCCH), and physical sidelink shared channel (PSSCH), if received via a sidelink interface.

16. A method for wireless communications performed by a first user equipment (UE), comprising:

receiving signaling from a scheduling node indicating a selection, from multiple candidates based on one or more criteria, of a signal for the first UE to use as a spatial quasi co-location (QCL) source for a receive or transmit beam to use for communicating with a second UE on a sidelink interface, wherein the multiple candidates comprise a first signal from the first UE to the second UE with a first signal quality and a second signal from the second UE to the first UE with a second signal quality, and wherein the one or more criteria indicate use of the first signal as the QCL source when the first signal quality is higher than the second signal quality or the second signal as the QCL source when the second signal quality is higher than the first signal quality; and communicating with the second UE on the sidelink interface with a receive or transmit beam determined based on the indicated selection.

17. The method of claim 16, wherein the signal selected for the first UE to use as a spatial QCL source comprises a reference signal or a channel.

18. The method of claim 16, wherein the scheduling node comprises the second UE or a base station.

19. The method of claim 16, wherein the signaling:

indicates the first UE should use a signal transmitted from the first UE to the second UE as the spatial QCL source; or indicates the first UE should use a signal transmitted from the second UE to the first UE as the spatial QCL source.

20. The method of claim 19, wherein the candidates include at least one of:

a first candidate for the first UE to use a signal transmitted from the first UE to the second UE as a QCL source for a receive beam for receiving a transmission from the second UE; or a second candidate for the first UE to use a signal transmitted from the second UE to the first UE as a QCL source for a transmit beam for sending a transmission to the second UE.

21. The method of claim 19, wherein the candidates include at least one of:

a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

22. The method of claim 16, wherein the candidates include:

at least one candidate for the first UE to use a reference signal transmitted between the first UE and a reference node different than second UE as a QCL source for a receive beam or a transmit beam to communicate with the second UE.

23. The method of claim 16, wherein the scheduling node makes the selection based on measurement results transmitted from the first UE:

via at least one of radio resource control (RRC) signaling, a medium access control (MAC) control element (CE), physical uplink control channel (PUCCH), or physical uplink shared channel (PUSCH), if forwarded via a cellular interface; or via at least one of sidelink equivalents or similar signaling mechanisms as RRC signaling and a MAC CE, physical sidelink control channel (PSCCH), and physical sidelink shared channel (PS SCH), if forwarded via a sidelink interface.

24. The method of claim 16, wherein the signaling from the scheduling node indicating the selection is received:

via at least one of radio resource control (RRC) signaling, a medium access control (MAC) control element (CE), downlink control information (DCI), or physical downlink shared channel (PDSCH), if received via a cellular interface; or via at least one of sidelink equivalents or similar signaling mechanisms as RRC signaling and a MAC CE, physical sidelink control channel (PSCCH), and physical sidelink shared channel (PSSCH), if received via a sidelink interface.

25. An apparatus for wireless communications performed by a scheduling node, comprising:
a memory comprising instructions; and
one or more processors configured, individually or in any combination, to execute the instructions and cause the scheduling node to:
select, from multiple candidates based on one or more criteria, a signal for a first user equipment (UE) to use as a spatial quasi co-location (QCL) source for a receive or transmit beam to use for communicating with a second UE on a sidelink interface, wherein the multiple candidates comprise a first signal from the first UE to the second UE with a first signal quality and a second signal from the second UE to the first UE with a second signal quality, and wherein the one or more criteria indicate use of the first signal as the QCL source when the first signal quality is higher than the second signal quality or the second signal as the QCL source when the second signal quality is higher than the first signal quality; and
signal the first UE an indication of the selection.

26. The apparatus of claim 25, wherein the candidates include at least one of:
a first candidate for the first UE to use a signal transmitted from the first UE to the second UE as a QCL source for a receive beam for receiving a transmission from the second UE; or
a second candidate for the first UE to use a signal transmitted from the second UE to the first UE as a QCL source for a transmit beam for sending a transmission to the second UE.

27. The apparatus of claim 26, wherein the candidates include at least one of:
a first candidate for the first UE to use a signal transmitted from the second UE to the first UE as a QCL source for a receive beam for receiving a transmission from the second UE; or
a second candidate for the first UE to use a signal transmitted from the first UE to the second UE as a QCL source for a transmit beam for sending a transmission to the second UE.

28. An apparatus for wireless communications performed by a first user equipment (UE), comprising:
a memory comprising instructions; and
one or more processors configured, individually or in any combination, to execute the instructions and cause the first UE to:
receive signaling from a scheduling node indicating a selection, from multiple candidates based on one or more criteria, of a signal for the first UE to use as a spatial quasi co-location (QCL) source for a receive or transmit beam to use for communicating with a second UE on a sidelink interface, wherein the multiple candidates comprise a first signal from the first UE to the second UE with a first signal quality and a second signal from the second UE to the first UE with a second signal quality, and wherein the one or more criteria indicate use of the first signal as the QCL source when the first signal quality is higher than the second signal quality or the second signal as the QCL source when the second signal quality is higher than the first signal quality; and
communicate with the second UE on the sidelink interface with a receive or transmit beam determined based on the indicated selection.

29. The apparatus of claim 28, wherein the candidates include at least one of:
a first candidate for the first UE to use a signal transmitted from the first UE to the second UE as a QCL source for a receive beam for receiving a transmission from the second UE; or
a second candidate for the first UE to use a signal transmitted from the second UE to the first UE as a QCL source for a transmit beam for sending a transmission to the second UE.

30. The apparatus of claim 28, wherein the candidates include at least one of:
a first candidate for the first UE to use a signal transmitted from the second UE to the first UE as a QCL source for a receive beam for receiving a transmission from the second UE; or a second candidate for the first UE to use a signal transmitted from the first UE to the second UE as a QCL source for a transmit beam for sending a transmission to the second UE.

* * * * *